United States Patent [19]

Takahashi et al.

[11] Patent Number: 5,021,700

[45] Date of Patent: Jun. 4, 1991

[54] DRIVING APPARATUS FOR ULTRASONIC MOTOR

[75] Inventors: Kenichiroh Takahashi, Katano; Noriyuki Harao, Ikoma; Hiromi Tanoue, Kadoma, all of Japan

[73] Assignee: Matsushita Electric Industrial Co., Ltd., Kadoma, Japan

[21] Appl. No.: 410,035

[22] Filed: Sep. 21, 1989

Related U.S. Application Data

[63] Continuation of Ser. No. 158,718, Feb. 23, 1988, abandoned.

[51] Int. Cl.⁵ .............................. H01L 41/08
[52] U.S. Cl. ................................... 310/316
[58] Field of Search .................. 310/316–319, 310/323, 328; 388/116, 118

[56] References Cited

U.S. PATENT DOCUMENTS

| | | | |
|---|---|---|---|
| 3,975,650 | 8/1976 | Payne | 310/316 |
| 4,371,816 | 2/1983 | Wieser | 310/316 X |
| 4,510,411 | 4/1985 | Hakamata | 310/328 X |
| 4,562,373 | 12/1985 | Tokusima et al. | |
| 4,626,728 | 12/1986 | Flachenecker et al. | 310/316 |
| 4,658,172 | 4/1987 | Izukawa | 310/316 |
| 4,684,842 | 8/1987 | Maruno et al. | 310/316 |
| 4,692,649 | 9/1987 | Izukawa et al. | 310/323 X |
| 4,713,571 | 12/1987 | Suzuki et al. | 310/328 X |
| 4,727,276 | 2/1988 | Izukawa et al. | 310/316 |
| 4,743,788 | 5/1988 | Takagi et al. | 310/316 |
| 4,749,896 | 6/1988 | Suzuki et al. | 310/323 X |

OTHER PUBLICATIONS

Study of the 70th regular meeting of the power electronics; "Ultrasonic Motor"; published 1986; Matsushita Electric Industrial Co., Ltd., Electric Motor Division.

Primary Examiner—Mark O. Budd
Attorney, Agent, or Firm—Cushman, Darby & Cushman

[57] ABSTRACT

A driving apparatus for an ultrasonic motor which generates a driving force by using a piezoelectric member, wherein an oscillation frequency fd is varied so as to follow a driving frequency fm which is particular to a mechanical resonance frequency fro when the mechanical resonance frequency fro varies by influence of environment. For this purpose, current and voltage detectors are provided for respectively detecting the current corresponding to the mechanical vibration of the piezoelectric member and the voltage impressed on the piezoelectric member. The phase difference between the detected current and voltage is detected, and this phase difference is used to drive a variable frequency oscillator so as to maintain the phase difference constant. The output of the variable frequency oscillator is then used to drive the driving circuit for the piezoelectric member of the ultrasonic motor.

5 Claims, 9 Drawing Sheets

DRIVING APPARATUS FOR ULTRASONIC MOTOR

This is a continuation of application Ser. No. 07/158,718, filed Feb. 23, 1988 which was abandoned upon the filing hereof.

FIELD OF THE INVENTION AND RELATED ART STATEMENT

1. Field of the Invention

This invention relates to an ultrasonic motor for generating a driving force by using a piezoelectric member, and more particularly, to a driving apparatus for driving piezoelectric members for vibrating an elastic member of the ultrasonic motor.

2. Description of the Related Art

In recent years, an ultrasonic motor has been paid attention to since the ultrasonic motor has a higher output per unit volume than the ordinary electric motor. The ultrasonic motor causes rotation movement or running movement by causing ultrasonic vibration with an electromechanical conversion element such as a piezo-electric member.

FIG. 1 shows a general structure of the conventional ultrasonic motor. In FIG. 1, the ultrasonic motor comprises a stator 4, a circular-shaped rotor 5, a bearing 9, a spring 10 and a nut 11. The stator 4 has stacked circular-shaped piezoelectric members 1, 2 and an elastic member 3. The circular-shaped rotor 5 has a lining member 6 in contact with the stator 4 and a shaft 7 which has a screw thread formed on one end for fixing it and an output shaft 8 connected thereto so as to transmit the rotation to an object to be rotated. The spring 10 and the nut 11 are provided so as to assemble the disk-shaped rotor 5 and the stator 4 with predetermined torque by screwing the nut 11 on the thread of the shaft 7. A circular shaped protrusion 3a is provided on the elastic member 3 of the stator 4 for transmitting the vibration energy, and thus the rotating force can be obtained by impressing signals of different phases on the piezoelectric members 1, 2.

FIG. 2 shows circuitry 22 of a driving apparatus for the ultrasonic motor. An oscillator 15 oscillates with a driving frequency fm particular to the stator 4 of ultrasonic motor 12. The driving circuit 22 is constituted by a phase shifter 17 and amplifiers 16, 18. The output signal of the oscillator 15 is inputted directly to the amplifier 16 and also is inputted to the amplifier 18 through the phase shifter 17. The phase shifter 17 outputs a phase shifted signal which is shifted in phase within a range between +10° to +170° (for normal direction drive) and −10° to −170° (for reverse direction drive). The output signal from the amplifier 16 is impressed on a first piezoelectric member 1 by lead wires 19, 20. Accordingly, in the stator 4, an oscillation wave of 4 wavelengths is formed corresponding to 4 sets of vibration members, because the stator 4 has 8 pole vibration members 13 (FIG. 1) in which the polarization directions of each neighboring vibration member are opposite. To a second piezoelectric member 2, the output from the amplifier 18 is impressed by lead wires 20, 21, and thus the second piezoelectric member 2 is also driven in the same manner as the first piezoelectric member 1.

When the stator 4 is driven as above-mentioned, the crests of vibration (maximum displacement point) of the stator 4 at the part facing the rotor 5 contact the rotor 5, and the crests of vibration move as time passes. Therefore, a force around the axis is given to the rotor 5. Thus, the rotor 5 rotates, as the rotor 5 repeatedly receives force the traveling wave the rotating direction around the axis the driving frequency fm which is particular to the stator 4.

In such an ultrasonic motor, it is necessary that the oscillation frequency fd of oscillator 15 corresponds to the driving frequency fm of the ultrasonic motor for obtaining high efficiency. However, the oscillation frequency fd deviates from the driving frequency fm due to the influence of the environment of the ultrasonic motor, i.e., due to temperature variation caused by heating with the passage of time. By such deviation, the generation efficiency of the traveling wave is deteriorated and the driving efficiency of the motor is also reduced, and in extreme cases, the motor stops.

OBJECT AND SUMMARY OF THE INVENTION

It is an object of the present invention to provide a driving apparatus for an ultrasonic motor wherein the oscillation frequency fd follows the driving frequency fm, which is particular to the mechanical resonance frequency fro, to maximize the driving efficiency and to obtain a stable rotation state.

A driving apparatus for an ultrasonic motor in accordance with the present invention comprises:

a piezoelectric member having a capacitor, current detection means for a current Im corresponding to mechanical vibration of the piezoelectric member, the current Im being determined by subtracting a current Io flowing in the capacitor of the piezoelectric member from a total current It flowing in the piezoelectric member, voltage detection means for detecting a voltage impressed on the piezo electric member, phase difference detection means for detecting phase a difference between the current which is detected by the current detection means and the voltage which is detected by the voltage detection means, a variable frequency oscillator which varies its oscillation frequency in response to an output of the phase difference detection means, so as to maintain the phase difference constant, and a driving circuit for driving the piezo electric member in response to the oscillation frequency from the variable frequency oscillator.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

In the present invention, a current (A.C. current) corresponding to mechanical vibration, which current contributes to the creation of mechanical vibration, is detected by current detection means, and a voltage (A.C. voltage) impressed on the piezo electric member is separately detected by voltage detection means. Phase difference detection means compare the phase of the current detected by the current detection means and the voltage detected by the voltage detection means and outputs a voltage corresponding to the detected phase difference ΔP. A differential amplifier compares the voltage output from the phase difference detection means and amplifies the differential voltage. By the output of the differential amplifier, the oscillator varies its oscillation frequency.

The frequency of oscillation i.e., the frequency fd of the output signal of the driving circuit is set to a driving frequency $fm_1$ which has the phase difference ΔP to a mechanical resonance frequency $fro_1$ of the stator 4. Therefore, $$fd = fm_1 \quad (1)$$

Figure 4:
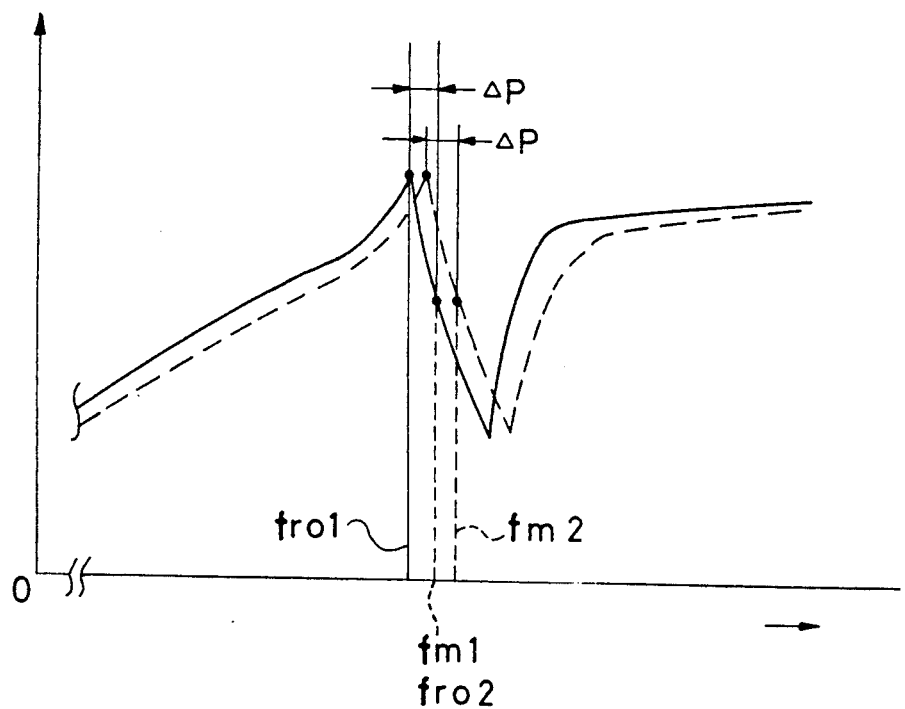
FIG. 4 is a graph showing an admittance characteristic curve.

Even when the mechanical resonance frequency $fro_1$ deviates to $fro_2$ and the driving frequency $fm_1$ deviates to $fm_2$ by influence of the environment of the ultrasonic motor, temperature variation caused from heating by operation of or ambient temperature change with the passage of time and the frequency of oscillation i.e., the frequency fd of the output signal of the driving circuit are controlled so as to change fd to the driving frequency $fm_2$ (see FIG. 4), namely:

$$fd = fm_2 \quad (2).$$

Referring now to the drawings, embodiments of the present invention are described hereafter.

Figure 1:
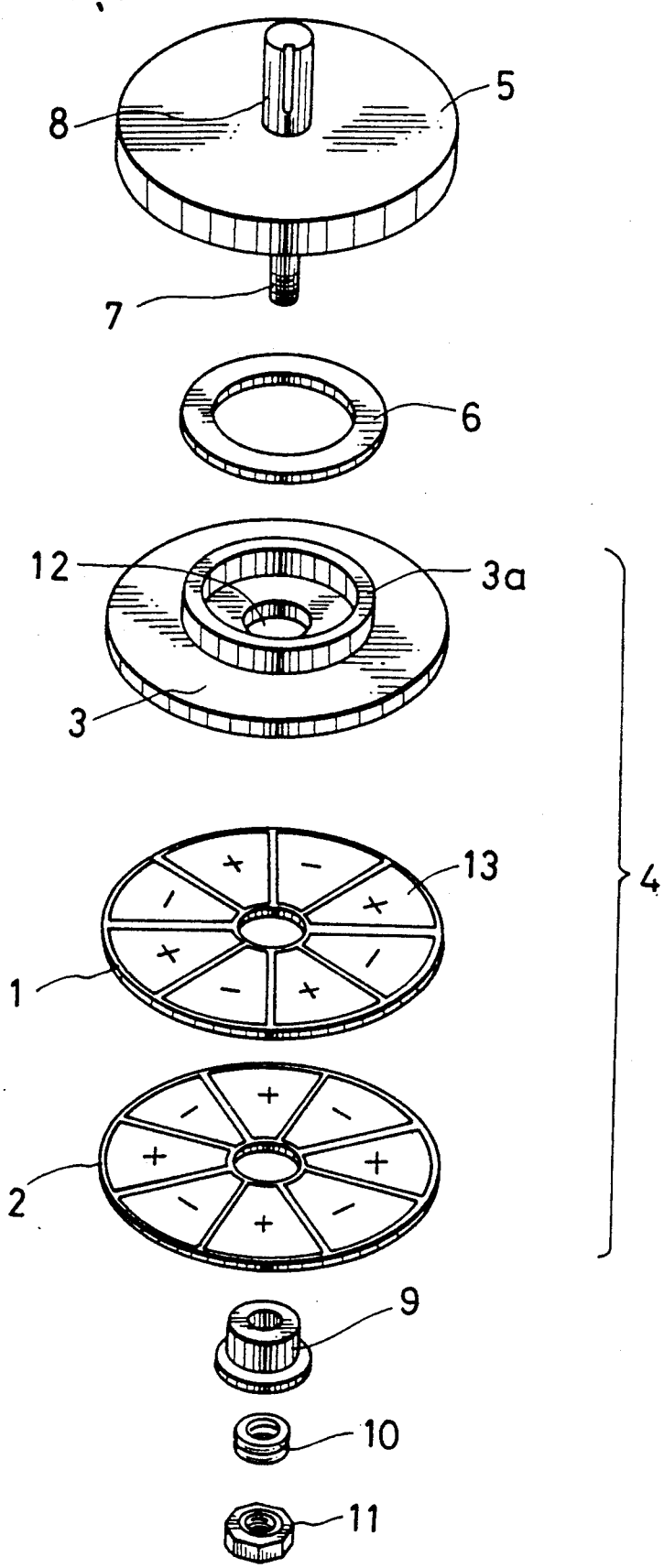
FIG. 1 is the exploded view of the general ultrasonic motor of the prior art.
Figure 2:
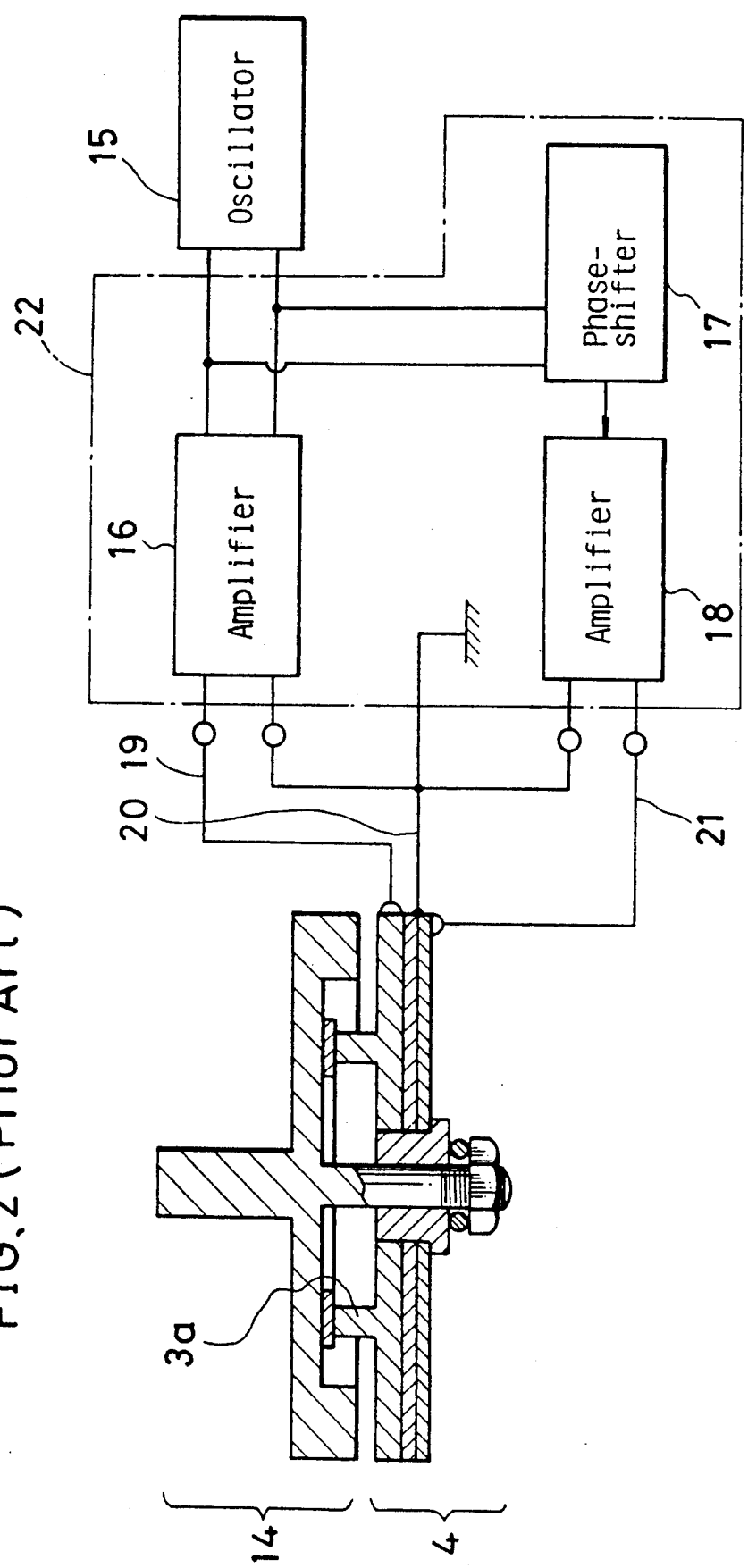
FIG. 2 is the cross-sectional view of the ultrasonic motor and the block diagram of the driving circuit of the prior art.
Figure 3A:
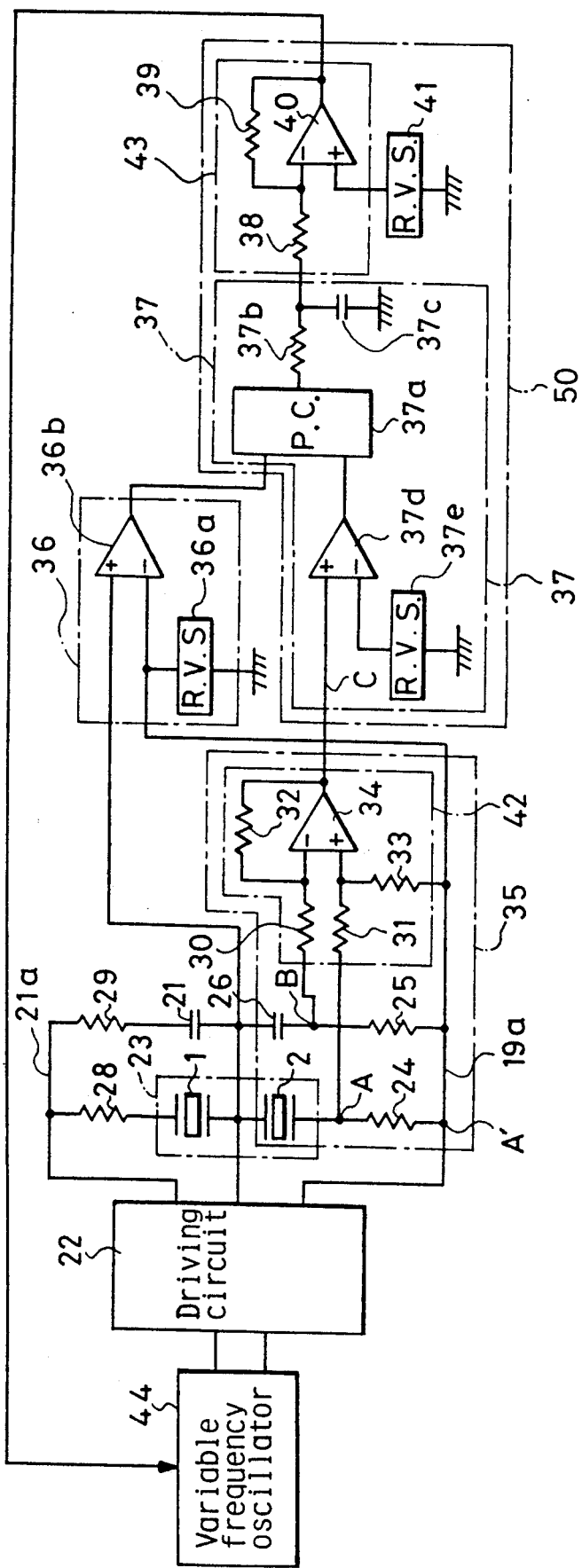
FIG. 3A is a circuit diagram of a driving apparatus for an ultrasonic motor of an embodiment of the present invention.

FIG. 3A shows a driving apparatus for an ultrasonic motor of an embodiment of the present invention. The same reference numerals of FIGS. 1 and 2 designate the same or corresponding components of FIGS. 1 and 2.

In FIG. 3A, an ultrasonic motor 23 is shown to have an electric circuit of piezoelectric members 1 and 2. A current detection circuit 35 is constituted by the piezoelectric member 2, a resistor 24 connected to the piezoelectric member 2 in series, a capacitor 26, one end of which is connected to a connecting point of the piezoelectric members 1, 2, a resistor 25 connected by one end to another end of the capacitor 26 and by another end to the opposite side A′ of the resistor 24 and an amplifier 42 having an operational amplifier 34 and resistors 30, 31, 32 and 33. The current detection circuit 35 detects the current flowing in the piezoelectric member 2 corresponding to the mechanical vibration.

Figure 5A:
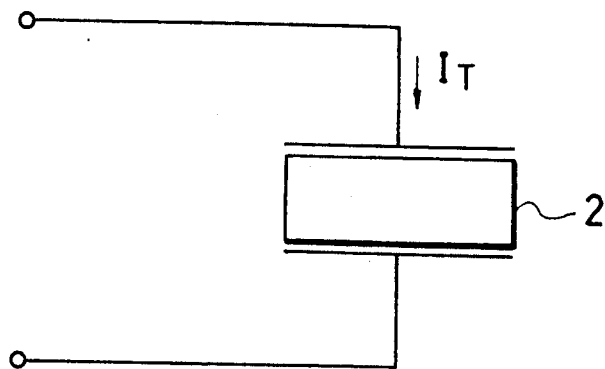
FIG. 5A and FIG. 5B are equivalent circuit diagrams of a piezoelectric member of an ultrasonic motor.
Figure 5B:
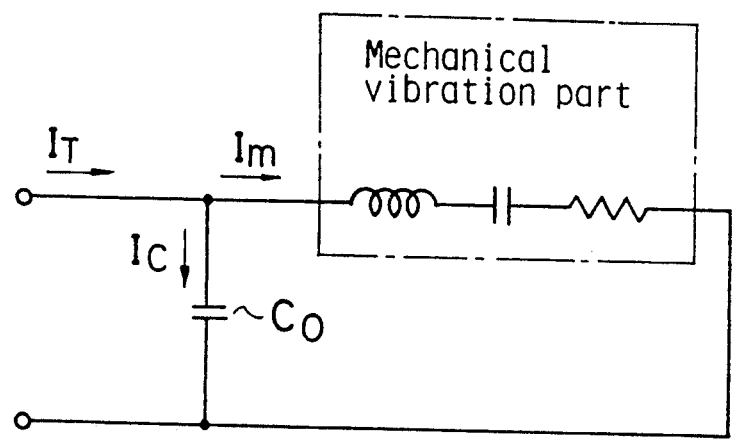

The operation of the current detection circuit 35 is described hereafter. The equivalent circuit diagrams of the piezoelectric member 2 are shown in FIG. 5A and FIG. 5B (The circuit is disclosed in page 99 to page 102, "Atudenzaikagaku no kiso (Fundamentals of science of piezoelectric member)", Takuro IKEDA, Ohm Sha, Ltd. of Japan). When the whole current flowing in the piezoelectric member 2 is defined as current $I_T$, the current $I_T$ is shown to consist of a current $I_m$ corresponding to the mechanical vibration and a current $I_c$ which flows in a capacitor Co of the piezoelectric member 2 and which comprises a higher harmonic component, as shown in FIG. 5B. Therefore, the current $I_m$ corresponding to the mechanical vibration can be calculated by substracting the current $I_O$ flowing in the capacitor Co from the current $I_T$ flowing in the piezoelectric member 2.

In the circuit, an electrostatic capacity of the capacitor 26 is set equal to an electostatic capacity of the capacitor Co of the piezoelectric member 2, and the resistor 24 is set equal to the resistor 25. Then, at the output terminal C of the differential amplifier 42, an output which is proportional to the current $I_m$ corresponding to the mechanical vibration is issued. Such output is given as a difference made by subtracting the current of the capacitor 26 (which represents the current flowing through the capacitance Co of the piezoelectric element 2) from the whole current $I_T$ of the piezoelectric element 2. Thus, the current $I_m$ corresponding to the mechanical vibration can be obtained.

Figure 6:
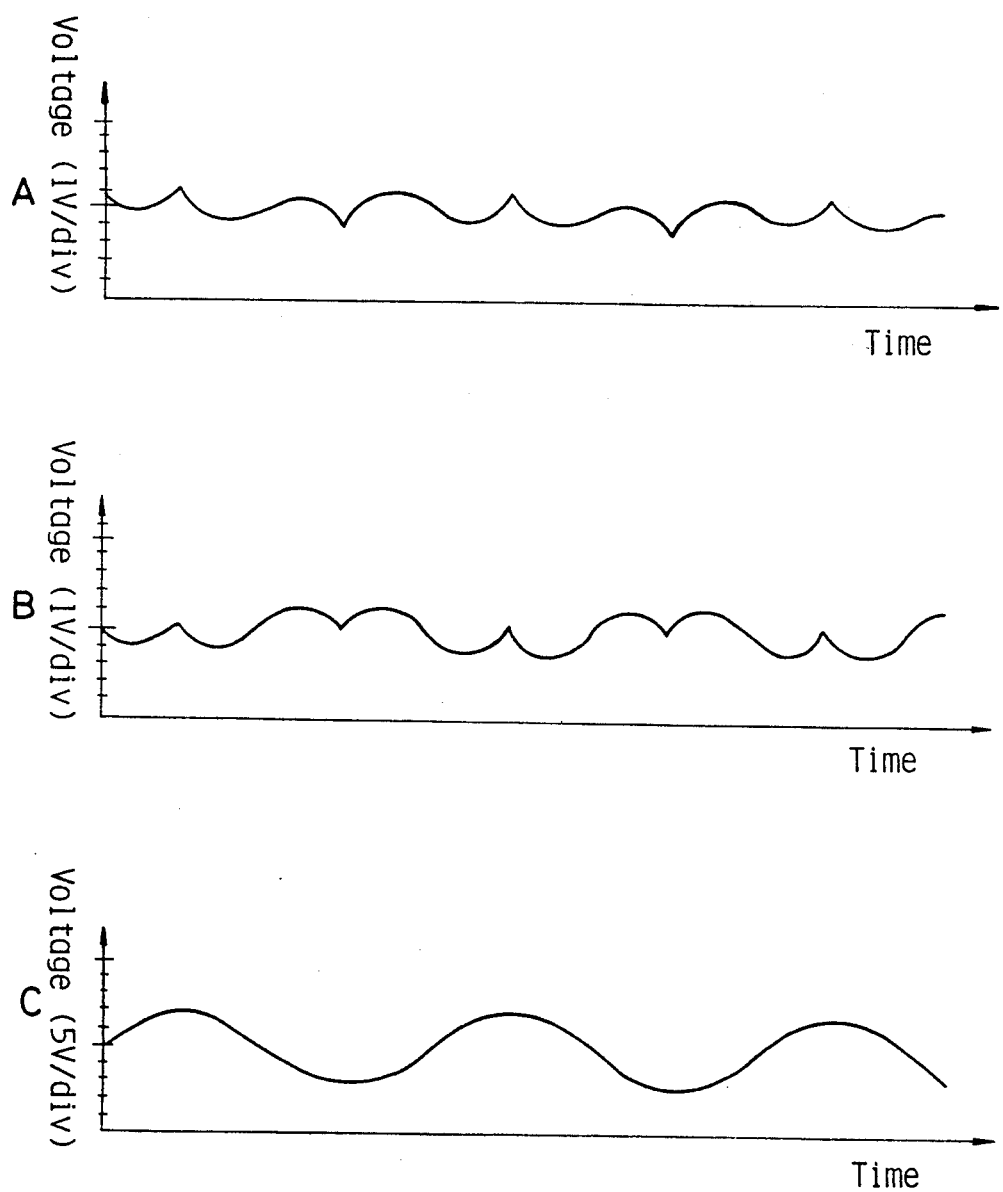
FIG. 6 is a waveform chart of points A, B and C in the circuit of FIG. 3

FIG. 6 shows output waveforms of signals on the points A, B and C shown in FIG. 3A. As shown in FIG. 6, waveforms distorted by higher harmonic components are issued in the signals on the points A and B. But on the point C the current $I_m$ corresponding to the mechanical vibration, whose phase can be compared with the voltage waveform, is obtainable.

A voltage detection circuit 36 then detects the voltage impressed on the piezoelectric member 2. The voltage detection circuit 36 comprises a reference voltage source 36a and a comparator 36b.

A phase difference detection circuit 37 compares the output waveforms of the current detection circuit 35 and the voltage detection circuit 36 and outputs a D.C. voltage corresponding to the detected phase difference. The phase difference detection circuit 37 comprises a reference voltage source 37e, a comparator 37d, an integrated circuit 37a (for example TP5081AP) for phase comparing, a resistor 37b and a capacitor 37c.

A deviation amplifier 43 comprising resistor 38 and 39 and an operational amplifier 40 compares the outputs of the phase difference detection circuit 37 and of a reference voltage source 41, and outputs the voltage corresponding to the detected deviation voltage.

A variable frequency oscillator 44 varies the oscillation frequency in response to the output voltage of the differential amplifier 43, and feeds the oscillation power to the driving circuit 22. The output of the driving circuit 22 is fed to the piezoelectric elements 1 and 2 of the ultrasonic motor 23 through the resistors 28 and 24.

Figure 3B:
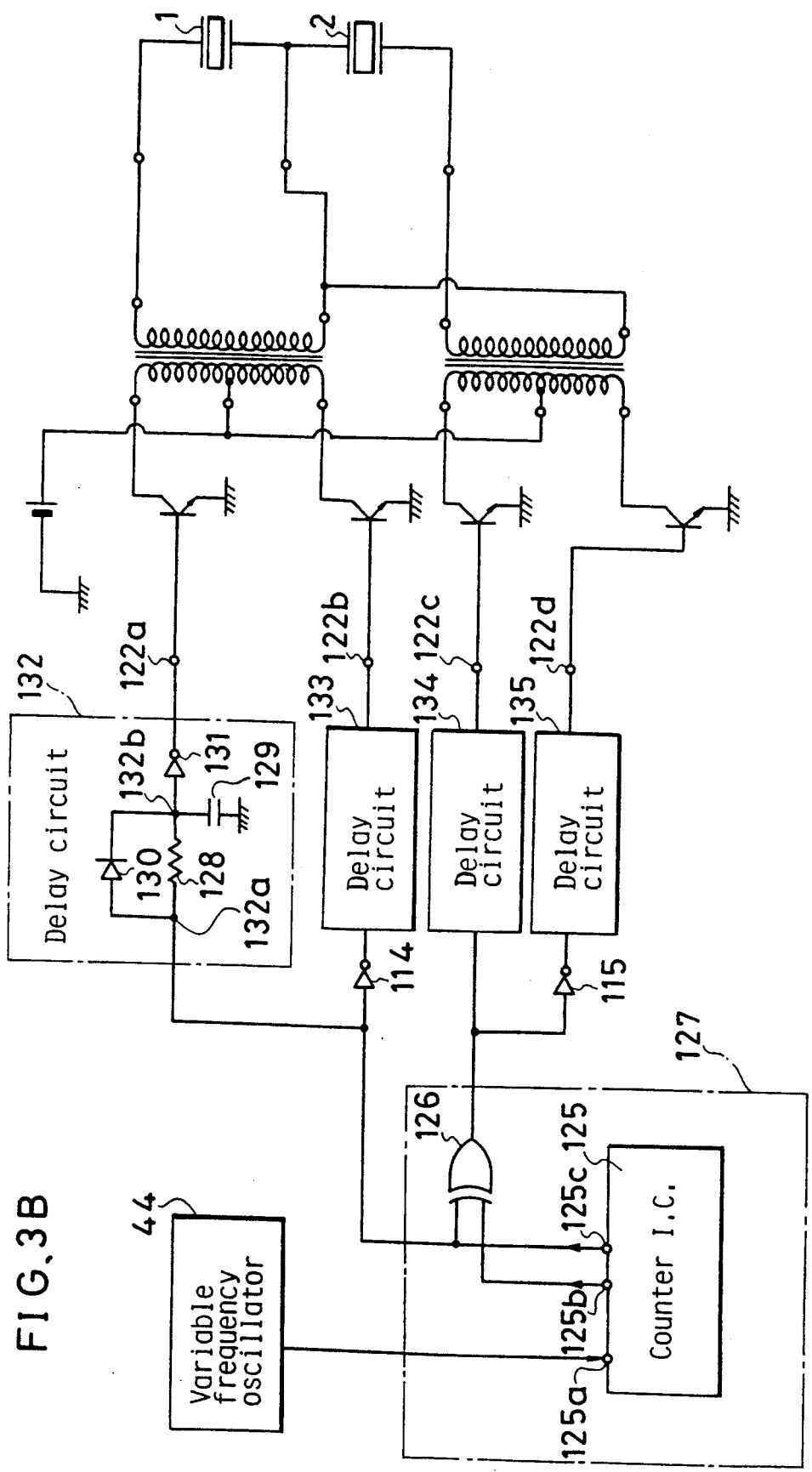
FIG. 3B is a circuit diagram of a driving circuit 22 of FIG. 3A.

The driving circuit is shown in FIG. 3B. In FIG. 3B, the piezoelectric members 1 and 2 are connected to the secondary windings of transformers 20, 21. The oscillator 44 comprises a timer IC which is available on the market, resistors, capacitors and etc. and is constituted as an astable multivibrator. A phase circuit 127 comprises a counter IC 125 and an exclusive OR 126 (hereinafter referred to as EOR gate). The counter IC 125 has a clock terminal 125a, an output terminal 125b for outputting a ½-frequency divided clock signal and an output terminal 125c for outputting ¼-frequency divided clock signal.

A delay circuit 132 comprises an integration circuit constituted by a resistor 128 and a capacitor 129, a diode 130 and an inverter (NOT) circuit 131 for waveform shaping. Delay circuits 133, 134 and 135 have the same construction as the delay circuit 132.

Figure 3C:
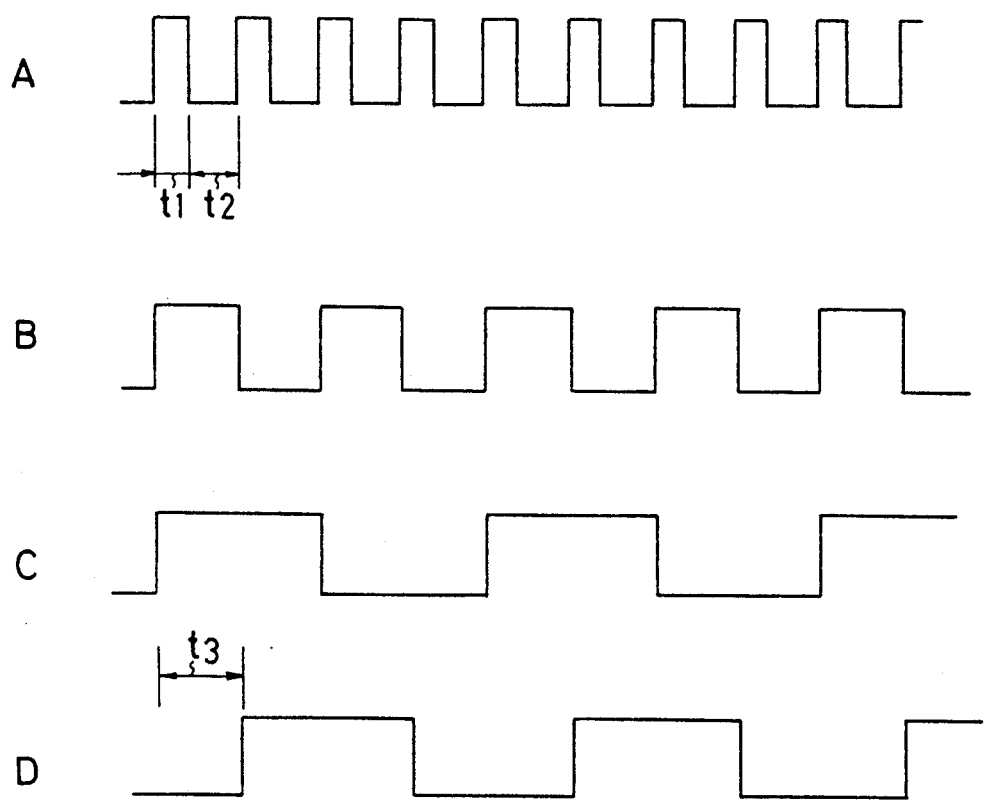
FIG. 3C is a chart of a phase circuit of FIG. 3B.
Figure 3D:
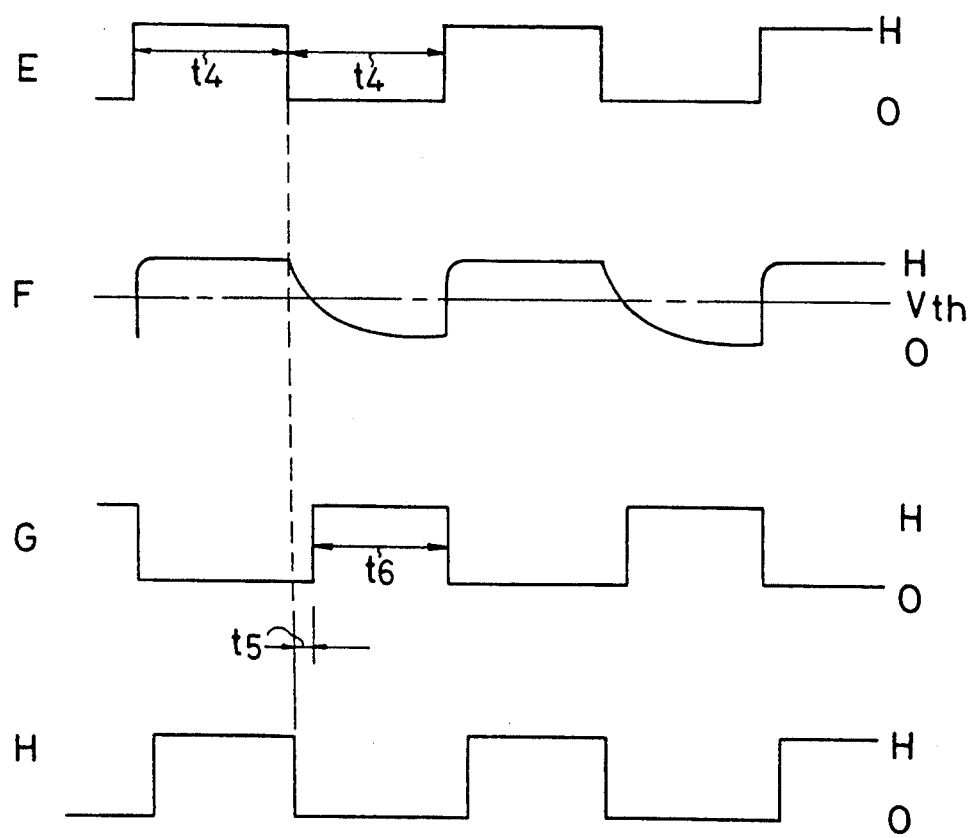
FIG. 3D is a waveform chart of a delay circuit of FIG. 3B.

FIGS. 3C and 3D show waveform of circuit of FIG. 3B. The oscillator 44 as an astable multivibrator outputs signal A shown in FIG. 3C to the clock terminal of the counter IC 125. As shown in FIG. 3C, the duty factor of this signal is t1:t2, where t1 is the time of the high state and t2 is the time of the low state, where the time t1 is not equal to the time t2. When the signal A is inputted to the terminal 125a of counter IC 125, the counter IC 125 outputs ½-frequency divided signal B from the signal A on the terminal 125b and outputs ¼-frequency divided signal C from the signal A on the terminal 125c. EOR gate 126 inputs the signals B and C and outputs a signal D which has phase difference t3 of 90° to the signal C. The signal C from the terminal 125c is inputted directly to the delay circuit 132 and is inputted to on the delay circuit 133 after inverting by the inverter 114. Also the signal D from the EOR gate 126 is inputted directly to the delay circuit 134 and is inputted on the delay circuit 135 after inverting by the inverter 115.

Referring now to FIG. 3D, operation of the delaying circuit is described hereafter. A signal E shows the signal on a point 132a, a signal F shows the signal on a point 132b and a signal G shows the output signal from NOT gate 131.

When a "H" (shows 5 V) signal is impressed on the point 132a, a forward direction current flows in the diode 130. Therefore, a difference voltage between "H" voltage and a base-emitter voltage $V_{VE}$ of the diode 130 is generated on the point 132b in a moment. Then the voltage on the point 132b rises to "H" voltage by the charging function of the resistor 128 and capacitor 129. Next, when the voltage of point 132a becomes zero voltage, the voltage of point 132b slowly drops from "H" voltage to zero voltage by the discharging function of the resistor 128 and capacitor 129 (see curve of signal F in FIG. 3D).

The signal F is inputted to NOT gate 131 for waveform shaping. NOT gate 131 outputs the signal G whose rise edge is delayed by time t5 to the end edge of the signal E because NOT gate 131 has the threshold voltage $V_{th}$. While duration of signal E in "H" state time (=t4) is the same as its duration of "L" state time (=t4), "H" state time (=t6) in the signal G is shorter than the duration of the "H" state time (=t4+t5). Therefore, the rise edge of signal G is delayed from the rising edge of signal E.

Signal H is obtained by delaying the signal E in the delay circuit 133 after inverting in the inverter 114.

As seen from the signals G and H, a time interval t5 is made between the rise edge of signal G and the end edge of signal H or between the end edge of signal G and the rise edge of signal H. Therefore, by using the signals G and H as the driving signals for driving circuit 122, undesirable simultaneous turning on of the two switching devices is prevented.

In FIG. 3A, resistors 28, 29 and a capacitor 27 are inserted for balancing the voltage impressed on the piezoelectric member. The resistor 28 has the same resistance value as the resistor 24 and is connected in series to the piezoelectric member 2. A series circuit of the capacitor 27 having the same capacity as the capacitor 26 and the resistor 29 having the same resistance value as the resistor 28 are connected between lines 20a and 21a. The piezoelectric members 1 vs. 2, the resistors 28 vs. 24, resistors 29 vs. 25 and the capacitors 27 vs. 26 are connected in a manner that the circuit is formed in symmetry concerning the line 20a as the axis of symmetry. By making such a symmetric structure, when the voltage level impressed between the lines 21a and 20a is set equal to that between the lines 20a and 19a (but the phase is different), the voltage level impressed on the piezoelectric member 1 becomes equal to that on the piezoelectric member 2. Therefore, the conventional trouble (such as reduction of efficiency) which has been caused by the difference between the voltage levels impressed on the piezoelectric members 1 and 2 are entirely removed. Accordingly, stable rotation of motor can be obtained.

In such a driving apparatus, when an oscillation frequency fd of the output signal of oscillator 44 is set to be the driving frequency $fm_1$, which has a phase difference ΔP from the mechanical resonance frequency $fro_1$ of the stator 4, the following equation is held:

$$fd = fm_1 \qquad (3).$$

Even when the mechanical resonance frequency $fro_1$ is deviated into $fro_2$ and the driving frequency $fm_1$ is deviated into $fm_2$, as a result of changes of environment such as a temperature change due to heating during operation or a change of ambient temperature, the output oscillation frequency, i.e., the output frequency fd of the driving circuit 22 is controlled to $fm_2$, namely:

$$fd = fm_2 \qquad (4).$$

The output frequency fd of the driving circuit 22 thus always follows the mechanical resonance frequency fro and the driving frequency fm.

As has been described in detail for the above embodiment, the driving apparatus for an ultrasonic motor in accordance with the present invention can provide the stable rotation of the ultrasonic motor without the reduction of driving efficiency even when the driving condition is varied by influence of environment changes.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus comprising:
   stator means for generating vibration waves in an ultrasonic motor, said stator means including a piezoelectric member having a capacitance;
   current detection means for detecting a current $I_m$ corresponding to mechanical vibration of said piezoelectric member, said current $I_m$ being determined by subtracting a capacitance current $I_o$ flowing in said piezoelectric member from a total current $I_t$ flowing in said piezoelectric member;
   voltage detection means for detecting a voltage impressed on said piezoelectric member;
   phase difference detection means for detecting a phase difference between said current which is detected by said current detection means and said voltage which is detected by said voltage detection means;

variable frequency oscillator means for generating an oscillation signal in response to an output of said phase difference detection means so as to maintain said phase difference constant; and driving means for driving said piezoelectric member in response to said oscillation signal from said variable frequency oscillator;

wherein said current detection means comprises:

a first resistor connected in series with said piezoelectric member so as to make a first series connection, a capacitor and a second resistor connected in series to form a second series connection, said second series connection being connected in parallel to said first series connection, an operational amplifier having one input terminal connected to a connecting point between said piezoelectric member and said first resistor, and another input terminal connected to a connecting point between said capacitor and said second resistor.

2. A driving apparatus for an ultrasonic motor in accordance with claim 3, wherein said phase difference detection means comprises:

a phase difference detection circuit for detecting said phase difference between said current $I_m$ flowing in said piezoelectric member and said voltage impressed on said piezoelectric member, a reference voltage source, and a differential amplifier for amplifying a voltage difference between an output voltage of said phase difference detection circuit and an output voltage of said reference voltage source.

3. A driving apparatus for an ultrasonic motor comprising:

first and second piezoelectric members having capacitances;

a first resistor connected in series to said first piezoelectric member so as to make a first series connection;

a second resistor connected in series to said second piezoelectric member so as to make a second series connection;

a first capacitor and a third resistor connected in series so as to form a third series connection, said third series connection being connected in parallel to said first series connection;

a second capacitor and a fourth resistor connected in series so as to form a fourth series connection, said fourth series connection being connected in parallel to said second series connection;

an operational amplifier having one input terminal connected to a connecting point between said first piezoelectric member and said first resistor and another input terminal connected to a connecting point between said first capacitor and said third resistor for outputting a detected current $I_m$ corresponding to mechanical vibration of one of said first and second piezoelectric members, said current $I_m$ being determined by subtracting a capacitance current $I_o$ flowing in said one of first and second piezoelectric members from a total current $I_t$ flowing in said one of said first and second piezoelectric members;

voltage detection means for detecting a voltage impressed on said piezoelectric member;

phase difference detection means for detecting a phase difference between said current $I_m$ and said voltage which is detected by said voltage detection means;

a variable frequency oscillator which varies its oscillation frequency in response to output of said phase difference detection means so as to maintain said phase difference constant; and a driving circuit for driving said first and second piezoelectric members in response to said oscillation frequency from said variable frequency oscillator.

4. An apparatus comprising:

a piezoelectric member having a capacitance;

current detection means for detecting a current $I_m$ corresponding to mechanical vibration of said piezoelectric member, said current $I_m$ being determined by subtracting a capacitance current $I_o$ flowing in said piezoelectric member from a total current $I_t$ flowing in said piezoelectric member, said current detection means comprising:

(i) first resistor means connected in series with said piezoelectric member so as to make a first series connection, (ii) capacitor means and a second resistor connected in series so as to form a second series connection, said second series connection being connected in parallel to said first series connection, and (iii) amplifier means having one input terminal connected to a connecting point between said piezoelectric member and said first resistor and said piezoelectric member, and another input terminal connected to a connecting point between said capacitor and said second resistor;

voltage detection means for detecting a voltage impressed on said piezoelectric member;

phase difference detection means for detecting a phase difference between said current which is detected by said current detection means and said voltage which is detected by said voltage detection means; and oscillator means which varies its oscillation frequency in response to an output of said phase difference detection means so as to maintain said phase difference constant;

a driving means for driving said piezoelectric member in response to said oscillation frequency from said variable frequency oscillator.

5. An apparatus as in claim 4 wherein said phase difference detection means comprises:

a phase difference detection circuit for detecting said phase difference between said current $I_m$ flowing in said piezoelectric member and said voltage impressed on said piezoelectric member, a reference voltage source, and a differential amplifier for amplifying a voltage difference between an output voltage of said phase difference detection circuit and an output voltage of said reference voltage source.

* * * * *